(12) United States Patent
Chao et al.

(10) Patent No.: US 9,262,008 B2
(45) Date of Patent: Feb. 16, 2016

(54) METHOD OF RECOGNIZING TOUCH

(71) Applicant: TIANJIN FUNAYUANCHUANG TECHNOLOGY CO., LTD., Tianjin (CN)

(72) Inventors: Li-Min Chao, New Taipei (TW); Chien-Yung Cheng, New Taipei (TW); Po-Sheng Shih, New Taipei (TW)

(73) Assignee: TIANJIN FUNAYUANCHUANG TECHNOLOGY CO., LTD., Tianjin (CN)

( * ) Notice: Subject to any disclaimer, the term of this patent is extended or adjusted under 35 U.S.C. 154(b) by 257 days.

(21) Appl. No.: 14/149,812

(22) Filed: Jan. 8, 2014

(65) Prior Publication Data
US 2015/0015535 A1    Jan. 15, 2015

(30) Foreign Application Priority Data
Jul. 12, 2013 (CN) .......................... 2013 1 0292898

(51) Int. Cl.
*G06F 3/041*     (2006.01)
*G06F 3/044*     (2006.01)

(52) U.S. Cl.
CPC .............. *G06F 3/0416* (2013.01); *G06F 3/044* (2013.01)

(58) Field of Classification Search
CPC ....... G06F 3/014; G06F 3/041; G06F 3/0412; G06F 3/044; G06F 3/0418; G06F 3/0416; G06F 2203/0331
USPC .................................................. 345/173–175
See application file for complete search history.

(56) References Cited

U.S. PATENT DOCUMENTS

2012/0313767 A1* 12/2012 Sitarski .................. B60K 35/00 340/425.5

FOREIGN PATENT DOCUMENTS

JP     2013-88982     5/2013

\* cited by examiner

*Primary Examiner* — Grant Sitta
*Assistant Examiner* — Amen Bogale
(74) *Attorney, Agent, or Firm* — Novak Druce Connolly Bove + Quigg LLP

(57) ABSTRACT

The disclosure relates to a method for recognizing touch on a touch panel. A first value and a second value are set. Sensing value $C_n$ is compared with the first value and the second value. When the sensing value $C_n$ is greater than or equal to the first value, a touch with finger is recognized. When the sensing value $C_n$ is smaller than the second value, no touch is recognized. When the sensing values $C_n$ are greater than or equal to the second value and smaller than the first value, following steps are taken. A time period is setting. Touch signals are sensed several times during the time period and a number of maximum sensing values $\Delta C_{peak}$ are selected. Average sensing values $\overline{\Delta C_{peak}}$ are calculated. When the average sensing values $\overline{\Delta C_{peak}}$ satisfy following formula: $0.8 \overline{\Delta C_{peak}} \leq \Delta C_{peak} \leq 1.2 \overline{\Delta C_{peak}}$, a touch with glove is determined. And when not, no touch is recognized.

9 Claims, 2 Drawing Sheets

METHOD OF RECOGNIZING TOUCH

This application claims all benefits accruing under 35 U.S.C. §119 from China Patent Application No. 201310292898.X, filed on Jul. 12, 2013 in the China Intellectual Property Office, the contents of which are hereby incorporated by reference.

BACKGROUND

1. Technical Field

The present disclosure relates to methods for recognizing touch on a touch panel and particularly a method of recognizing touch on a capacitive touch panel.

2. Description of Related Art

In recent years, various electronic apparatuses such as mobile phones, car navigation systems have advanced toward high performance and diversification. There is continuous growth in the number of electronic apparatuses equipped with optically transparent touch panels in front of their display devices such as liquid crystal panels. A user of such electronic apparatus operates it by pressing a touch panel with a finger or a stylus while visually observing the display device through the touch panel.

According to working principle and transmission medium, touch panel has four types of resistance capacitance, infrared, and surface acoustic-wave. Capacitive touch panel has been widely used for its higher sensitivity and lower touch pressure required.

Working principle of capacitive touch panel is as follows: distribution of capacitance on the touch panel is changed by finger touch, the change of distribution of capacitance is detected and a touch position is obtained. However, if the finger is coated by an insulator such as gloves, touch cannot be recognized, thereby causing inconvenience to users.

What is needed, therefore, is a method of recognizing touch that can overcome the above-described shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

The first embodiment of the method of recognizing touch is provided. The method of recognizing touch can be applied on all kinds of self-inductance capacitive touch panels. In the self-inductance capacitive touch panels, changes of capacitance between conductive film of the touch panels and ground are detected in the capacitive touch panels.

The self-inductance capacitive touch panel comprises a transparent insulative substrate, a transparent conductive film, a plurality of sensing and driving electrodes, and at least one integrated circuit (IC). The transparent conductive film is located on a surface of the transparent insulative substrate. The plurality of sensing and driving electrodes are electrically connected with the transparent conductive film. The at least one IC is electrically connected with each of the plurality of sensing and driving electrodes. The transparent conductive film is driven by the plurality of sensing and driving electrodes. Changes of a plurality of capacitance of the transparent conductive films are detected by the at least one IC.

The transparent conductive film can be a conductive film with anisotropic impedance. A surface of the transparent conductive film has a high impedance along a first direction. The surface of the transparent conductive film has a low impedance along a second direction. The plurality of sensing and driving electrodes are located on at least one side of the transparent conductive film along the first direction and spaced with each other. In one embodiment, the transparent conductive film comprises a plurality of conductive blocks. The plurality of conductive blocks are spaced from each other and arranged in an array. Shape of one of the plurality of conductive blocks can be rectangle, rhombus, and so on. Material of the plurality of conductive blocks can be indium tin oxide or carbon nanotube. Each of the plurality of conductive blocks is electrically connected with one of the at least one IC via one of the plurality of sensing and driving electrodes.

The at least one IC comprises a driving IC and a sensing IC. The driving IC is used to provide driving signals to the plurality of sensing and driving electrodes. The sensing IC is used to detect signal values of touch panel via the plurality of sensing and driving electrodes.

Figure 1:
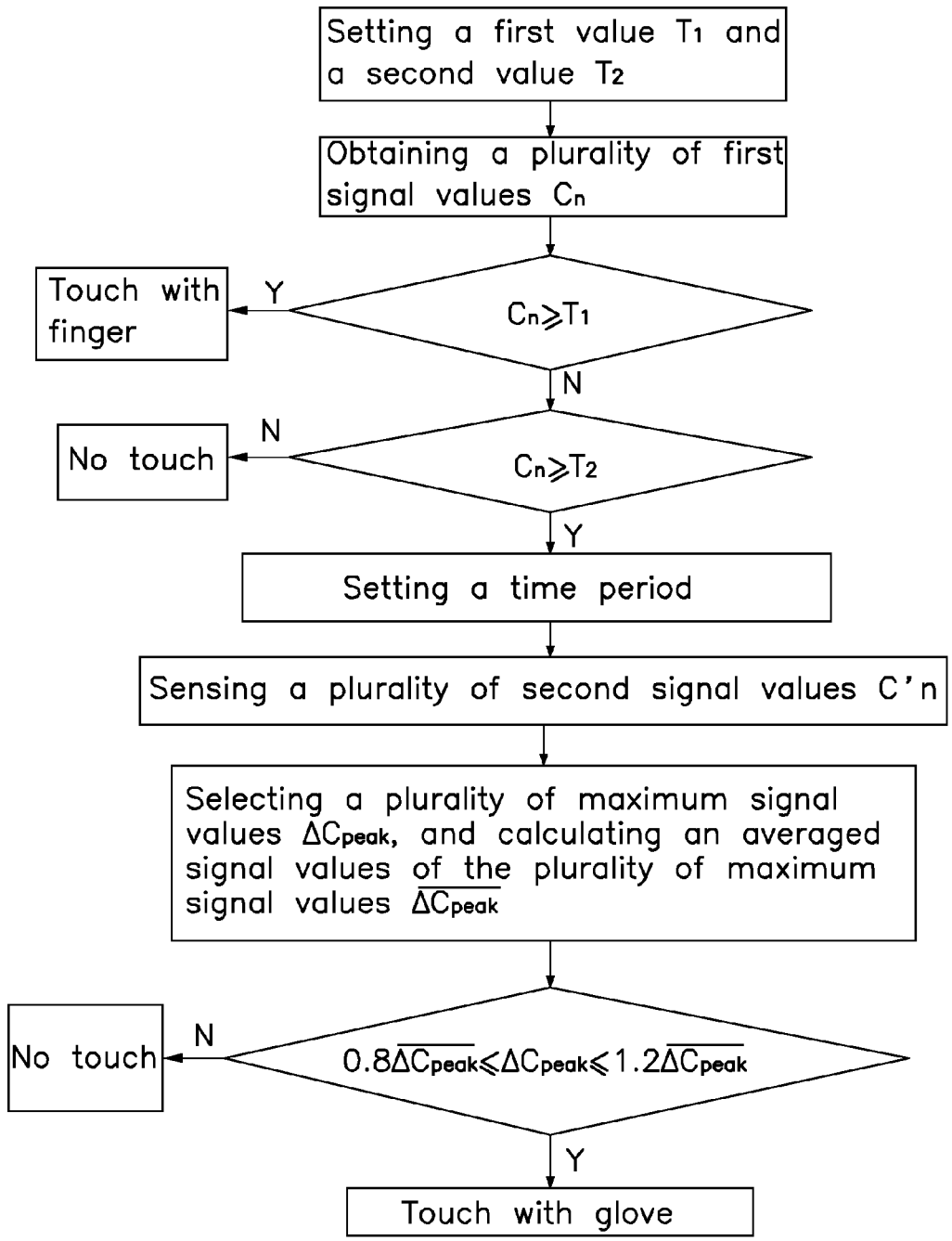
FIG. 1 is a flowchart of a method of recognizing touch on a touch panel.

Referring to FIG. 1, the method of recognizing touch comprises following steps:

S1, setting a first value $T_1$ and a second value $T_2$, wherein the second value $T_2$ is smaller than the first value $T_1$;

S2, driving the plurality of sensing and driving electrodes by the drive IC, sensing touch signals by each of the plurality of sensing and driving electrodes, and obtaining a plurality of first signal values $C_n$, wherein n is a natural number;

S3, comparing the plurality of first signal values $C_n$ with the first value $T_1$ and the second value $T_2$, when the plurality of first signal values $C_n$ is greater than or equal to the first value $T_1$, recognizes as a touch with finger; when the plurality of first signal values $C_n$ is smaller than the second value $T_2$, recognizes as no touch; when the plurality of first signal values $C_n$ is greater than or equal to the second value $T_2$ and smaller than the first value $T_1$, further taking following steps:

S4, setting a time period;

S5, driving the plurality of sensing and driving electrodes several times and sensing a plurality of second signal values $C'_n$, at each time during the time period;

S6, selecting a maximum signal value $\Delta C_{peak}$ from the plurality of second signal values $C'_n$ of each time to obtain a plurality of maximum signal values $\Delta C_{peak}$, and calculating an averaged signal values $\overline{\Delta C_{peak}}$ of the plurality of maximum signal values $\Delta C_{peak}$, when the plurality of maximum signal values $\Delta C_{peak}$ satisfies following formula: $0.8\overline{\Delta C_{peak}} \leq \Delta C_{peak} \leq 1.2\overline{\Delta C_{peak}}$, recognizes as a touch with glove; and when not, recognizes as no touch.

In step (S1), the first value $T_1$ can be a threshold value of sensing signal of traditional capacitive touch panel. In one embodiment, the first value $T_1$ is defined as a maximum signal value of sensing when a finger contacts the touch panel in a critical state. The critical state means that distance between the finger and a screen of the touch panel is very small and the finger nearly contacts with the screen.

In one embodiment, the second value $T_2$ is greater than background signal value. The background signal value is a parasitic capacitance with no touch. The background signal value is caused by conductive wires connecting with the IC.

In step (S2), the plurality of first signal values $C_n$ is a difference value between signal values of touching at one position of the transparent conductive film when the touch panel is touched and not touched.

In step (S3), when the plurality of first signal values $C_n$ is smaller than the first value $T_1$, the plurality of first signal values $C_n$ are further compared with the second value $T_2$ in order to recognize whether it is no touch or a touch with glove, and not to be recognized as no direct touch. The touch with glove means an insulator such as a glove exists between the screen and the finger. When the plurality of first signal values $C_n$ is smaller than the second value $T_2$, it is determined that finger has a long distance with the screen or a background signal is recognized. When the plurality of first signal values $C_n$ is greater than or equal to the second value $T_2$ and smaller than the first value $T_1$, it is further determined whether it is a touch with glove.

"False touch" means that the finger does not touch the screen actually and is just near the screen. When the distance between the screen of touch panel and the finger is about a thickness of glove, the IC would sense this "false touch." When the touch is the "false touch", the finger could not keep static during the time period and would move away from the screen. Therefore, the step (S4) to step (S6) are taken in order to prevent recognizing to the "false touch."

In step (S6), the time period ranges from one second to four seconds. Touch can be two types of fixing and sliding. The fixing touch means the finger touches on a same position during the time period, and the plurality of maximum signal values $\Delta C_{peak}$ are equivalent. The sliding touch means the finger moves on the screen during the time period, and the plurality of maximum signal values $\Delta C_{peak}$ are changed with the touching position.

When the finger touches a position of one of the plurality of conductive blocks, the signal value is great; when the finger touches a position between adjacent two of the plurality of conductive blocks, the signal value is small. Therefore, the maximum signal values $\Delta C_{peak}$ of several times are obtained and the averaged signal values $\overline{\Delta C_{peak}}$ of the plurality of maximum signal values $\Delta C_{peak}$ of several times are calculated.

When the finger with glove touches the screen of the touch panel, signal values sensed by the IC are small, and change trend of signal values is great. In order to recognize touch more accurately, steps (S7) to (S9) are taken after step (S6).

Step (S7), setting a third value a;

Step (S8), sensing a plurality of third signal values of adjacent second positions near first positions of the plurality of maximum signal values $\Delta C_{peak}$; and Step (S9), calculating a ratio b of one of the plurality of maximum signal values $\Delta C_{peak}$ and one of the plurality of third signal values each time, and comparing the ratio b with the third value a, when the ratio b is greater than the third value a, recognizes as a touch with glove.

In step (S8), the first positions and the second positions are on the transparent conductive film. Distances between the first positions and the second positions are smaller than or equal to half of size of finger.

The third value a is defined as a ratio of maximum signal value of finger touching and an adjacent signal value of a position that adjacent to touching position. In one embodiment, the third value a is the ratio of the maximum signal value of finger touching in the critical state and the adjacent signal value of the adjacent position.

One of the plurality of conductive blocks corresponding to the plurality of maximum signal values $\Delta C_{peak}$ is defined as a first conductive block, and a conductive block adjacent to the first conductive block is defined as a second conductive block. Distances between the first conductive block and the second conductive block are smaller than or equal to half of size of finger.

Figure 2:
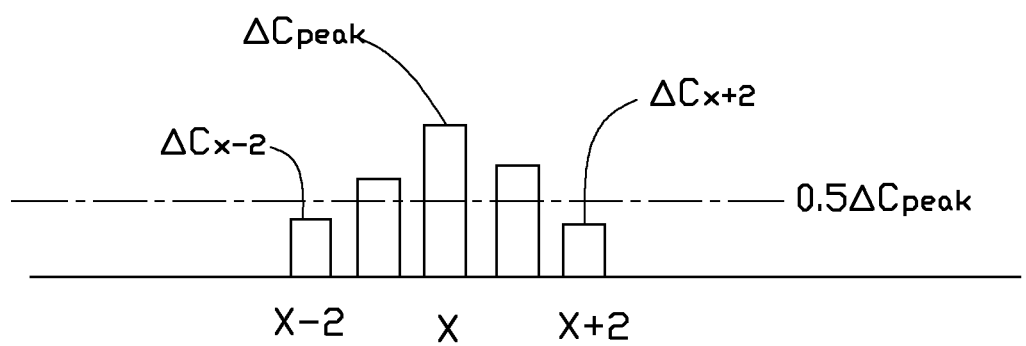
FIG. 2 is a view of signals of touch screen detected by an integrated circuit (IC).

In one embodiment, the first conductive block is defined as X, conductive block in same row or column with the first conductive block is defined as X+N or X−N. For example, the first conductive block are defined as X, the second conductive block are in the same row or column with the first conductive block and defined as X+1 or X−1, and conductive block adjacent to and in the same row or column with the second conductive block are defined as X+2 or X−2. Referring to FIG. 2, signal values of conductive block X+2 or X−2 are defined as the adjacent signal value, thus the third value a is 2. When finger touches the screen in the critical state, the third value a of signal value of conductive block X and signal value of conductive block X+2 or X−2 is 2. Signal value of conductive blocks X+2 is defined as $\Delta C_{x+2}$. Signal value of conductive block X−2 is defined as $\Delta C_{x-2}$. When the $\Delta C_{x+2}$ is smaller than one-half of $\Delta C_{peak}$ and the $\Delta C_{x-2}$ is smaller than one-half of $\Delta C_{peak}$, touch with glove is recognized.

The second embodiment of the method of recognizing touch is provided. The method is similar to that of the first embodiment, except that the transparent conductive film comprises a carbon nanotube structure. The carbon nanotube structure is a conductive film with anisotropic impedance and a successive complete structure. A surface of the carbon nanotube structure has a high impedance along a first direction. The surface of the carbon nanotube structure has a low impedance along a second direction. The plurality of sensing and driving electrodes are spaced with each other. The plurality of sensing and driving electrodes are arranged on at least one side of the carbon nanotube structure along the first direction. The carbon nanotube structure comprises at least one carbon nanotube film. The carbon nanotube film can be obtained by drawing from a carbon nanotube array. The carbon nanotube film comprises a plurality of successive and oriented carbon nanotubes joined end-to-end by van der Waals attractive force therebetween. A majority of the plurality of carbon nanotubes are arranged to extend along the second direction. The plurality of carbon nanotubes are parallel with a surface of the carbon nanotube film. Distances between adjacent two of the plurality of driving and sensing electrodes are smaller than or equal to half of size of the finger.

The method of recognizing touch has the advantage of recognizing both touch with finger and touch with glove. Some other errors of recognizing can be eliminated by the formula $0.8\overline{\Delta C_{peak}} \leq \Delta C_{peak} \leq 1.2\overline{\Delta C_{peak}}$.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure.

What is claimed is:

1. A method of recognizing touch on a touch panel, wherein the touch panel comprises a plurality of sensing and driving electrodes, and the method comprising:
   setting a first value $T_1$ and a second value $T_2$, wherein the second value $T_2$ is smaller than the first value $T_1$;
   driving the plurality of sensing and driving electrodes by a drive IC, sensing touch signals by each of the plurality of sensing and driving electrodes, and obtaining a plurality of first signal values $C_n$, wherein n is a natural number;
   comparing the plurality of first signal values $C_n$ with the first value $T_1$ and the second value $T_2$, when the plurality of first signal values $C_n$ is greater than or equal to the first value $T_1$, recognizes as a touch with finger; when the plurality of first signal values $C_n$ is smaller than the second value $T_2$, recognizes as no touch; when the plurality of first signal values $C_n$ is greater than or equal to the second value $T_2$ and smaller than the first value $T_1$, takes following steps;
   setting a time period;
   driving the plurality of sensing and driving electrodes several times and sensing a plurality of second signal values $C'_n$ at each time during the time period; and
   selecting a maximum signal value $\Delta C_{peak}$ from the plurality of second signal values $C'_n$ of each time to obtain a plurality of maximum signal values $\Delta C_{peak}$, and calculating an averaged signal values $\overline{\Delta C_{peak}}$ of the plurality of maximum signal values $\Delta C_{peak}$, when the plurality of maximum signal values $\Delta C_{peak}$ satisfy following formula: $0.8\overline{\Delta C_{peak}} \leq \Delta C_{peak} \leq 1.2\overline{\Delta C_{peak}}$, recognizes a touch with glove; and when the plurality of maximum signal values $\Delta C_{peak}$ does not satisfy the formula: $0.8\overline{\Delta C_{peak}} \leq \Delta C_{peak} \leq 1.2\overline{\Delta C_{peak}}$, recognizes as no touch.

2. The method of claim 1, wherein when the plurality of maximum signal values $\Delta C_{peak}$ satisfies following formula: $0.8\overline{\Delta C_{peak}} \leq \Delta C_{peak} \leq 1.2\overline{\Delta C_{peak}}$, further takes following steps:
   setting a third value a;
   sensing a plurality of third signal values of adjacent second positions near first positions of the plurality of maximum signal values $\Delta C_{peak}$; and
   calculating a ratio b of one of the plurality of maximum signal values $\Delta C_{peak}$ and one of the plurality of third signal values each time, and comparing the ratio b with the third value a, when the ratio b is greater than the third value a, recognizes as touch with glove.

3. The method of claim 2, wherein the third value a is defined as a ratio of maximum signal value of a finger touching and an adjacent signal value of a position that adjacent to a touching position.

4. The method of claim 3, wherein the touch panel further comprises a transparent conductive film comprising a plurality of conductive blocks, the plurality of conductive blocks are spaced with each other and arranged in an array, and distance between adjacent two of the plurality of conductive blocks is smaller than or equal to half of size of the finger.

5. The method of claim 4, wherein one of the plurality of conductive blocks corresponding to the plurality of maximum signal values $\Delta C_{peak}$ is defined as X, one of the plurality of conductive blocks in same row or column and spacing with one conductive block is defined as X+2 or X−2, signal value of conductive block X+2 is defined as $\Delta C_{x+2}$, signal value of conductive blocks X−2 is defined as $\Delta C_{x-2}$, when the $\Delta C_{x+2}$ is smaller than one-half $\Delta C_{peak}$ and the $\Delta C_{x-2}$ is smaller than one-half $\Delta C_{peak}$, touch with glove is recognized.

6. The method of claim 3, wherein the transparent conductive film is a carbon nanotube structure with anisotropic impedance, a surface of the transparent conductive film has a high impedance along a first direction, the plurality of sensing and driving electrodes are arranged on at least one side of the transparent conductive film along the first direction and spaced with each other, and distance between adjacent two of the plurality of driving and sensing electrodes is smaller than or equal to half of a size of the finger.

7. The method of claim 1, wherein the first value $T_1$ is defined as a maximum signal value of sensing when a finger contacts the touch panel in a critical state.

8. The method of claim 1, wherein the second value $T_2$ is greater than a background signal value.

9. The method of claim 1, wherein the time period ranges from one second to four seconds.

* * * * *